US007500493B2

(12) United States Patent
Vorenkamp et al.

(10) Patent No.: US 7,500,493 B2
(45) Date of Patent: Mar. 10, 2009

(54) TUNING SLIDE VALVE FOR INTAKE MANIFOLD

(75) Inventors: Erich J. Vorenkamp, Pinckney, MI (US); James J. Kempf, Canton, MI (US); Richard V. Rich, Canton, MI (US); Gregory S. Green, Dearborn, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 203 days.

(21) Appl. No.: 11/590,298

(22) Filed: Oct. 31, 2006

(65) Prior Publication Data

US 2008/0121296 A1 May 29, 2008

(51) Int. Cl.
*F16K 3/12* (2006.01)

(52) U.S. Cl. .......... 137/625.33; 123/184.56

(58) Field of Classification Search .......... 137/625.28, 137/625.3, 625.33; 123/184.56
See application file for complete search history.

(56) References Cited

U.S. PATENT DOCUMENTS

| | | | | |
|---|---|---|---|---|
| 1,112,066 | A * | 9/1914 | Hollis | 48/189.4 |
| 2,576,848 | A * | 11/1951 | Mercier et al. | 137/625.33 |
| 2,601,231 | A | 6/1952 | Smith et al. | |
| 2,993,488 | A * | 7/1961 | Stec | 123/188.5 |
| 3,312,241 | A * | 4/1967 | Bryant | 137/599.08 |
| 3,393,627 | A * | 7/1968 | Eurich | 454/324 |
| 3,426,668 | A | 2/1969 | Hofmeister et al. | |
| 3,802,406 | A | 4/1974 | Menneson | |
| 4,691,670 | A | 9/1987 | Bonisch et al. | |
| 4,718,455 | A * | 1/1988 | Dussourd et al. | 137/625.3 |
| 4,964,566 | A | 10/1990 | Pugh et al. | |
| 5,207,614 | A * | 5/1993 | Passadore | 454/298 |
| 5,349,986 | A | 9/1994 | Sullivan et al. | |
| 5,379,732 | A | 1/1995 | Mavinahally et al. | |
| 5,590,628 | A | 1/1997 | Patyi et al. | |
| 5,655,500 | A | 8/1997 | Kato | |
| 5,704,326 | A | 1/1998 | Minegishi et al. | |
| 5,803,044 | A | 9/1998 | Kato | |
| 5,816,209 | A | 10/1998 | Kato | |
| 5,884,604 | A | 3/1999 | Kato | |
| 5,911,205 | A | 6/1999 | Gambaradella | |
| 5,924,409 | A | 7/1999 | Kato | |
| 5,957,108 | A | 9/1999 | Kato | |
| 5,992,370 | A | 11/1999 | Pringle et al. | |
| 6,032,634 | A | 3/2000 | Minegishi et al. | |
| 6,637,397 | B2 | 10/2003 | Ward et al. | |
| 6,827,054 | B2 | 12/2004 | Bucknell et al. | |
| 6,955,149 | B1 | 10/2005 | Christie et al. | |
| 7,011,066 | B2 | 3/2006 | Ward et al. | |
| 7,059,299 | B2 * | 6/2006 | Clark | 123/337 |
| 2005/0066935 | A1 * | 3/2005 | Clark | 123/336 |

* cited by examiner

*Primary Examiner*—John Fox
(74) *Attorney, Agent, or Firm*—Fraser Clemens Martin & Miller LLC; J. Douglas Miller

(57) ABSTRACT

A slide valve for use in an air intake manifold is disclosed, wherein a durability of the valve and a quality of a seal created while the valve is in a closed position are maximized, and a cost and a weight of the valve are minimized.

17 Claims, 4 Drawing Sheets

TUNING SLIDE VALVE FOR INTAKE MANIFOLD

FIELD OF THE INVENTION

The present invention relates to a tuning valve and more particularly to a planar slide valve for use in an intake manifold.

BACKGROUND OF THE INVENTION

Variable geometry intake manifolds for engines are known. In such a manifold, intake air is controlled to different runners from a plenum to provide varying conditions at an inlet port of a cylinder. The plenum may include a plurality of chambers formed therein, wherein each chamber communicates with a separate runner or bank of runners. The chambers may include tuning valves disposed between adjacent chambers to facilitate communication therebetween. The tuning valves are used as a means of managing the pressure wave dynamics within the manifold, thereby influencing the volumetric efficiency of the engine.

Prior art tuning valves, typically butterfly valves, may be prone to leakage or permitting undesirable communication to occur across the valve. More specifically, when the butterfly valve is in a closed position, the pressure pulsations exerted on the valve can cause the valve to open slightly or otherwise impinge on existing gaps in the closed valve, wherein a small amount of fluid, such as air, is permitted to communicate therethrough. To overcome this problem, some butterfly valves are produced with elastomeric seals around their periphery in combination with stronger springs to maintain valve position while under load. These additions tend to increase the costs of the assembly with additional materials and the need for more powerful actuation devices. While these sealed tuning valves have resulted in reduced leakage of pressure pulsations and fluid past the valve while in a closed position, there is a continued desire to maximize the robustness of the seal and minimize the cost, weight, and complexity of the valves.

Another problem associated with butterfly style tuning valves is that debris may accumulate on the sealing surfaces of the valve. The debris can prevent a full closure of the valve, which is undesirable.

Another problem associated with butterfly type valves occurs when part of the valve protrudes into adjacent air flow paths when changing from closed to open position, such as when the valve is positioned close to the runner entry points or critical flow passages, disturbing airflow to the engine and, thus, negatively affecting engine performance.

It would be desirable to produce a tuning valve for use in an intake manifold, wherein a durability thereof and a quality of a seal in a closed position are maximized, communication is sufficient when in an open position, and wherein a cost and a weight thereof are minimized.

SUMMARY OF THE INVENTION

Harmonious with the present invention, a tuning valve for use in an intake manifold, wherein a durability thereof and a quality of a seal in a closed position are maximized, communication is sufficient when in an open position, and wherein a cost and a weight thereof are minimized, has surprisingly been discovered.

In one embodiment, an valve for an air intake manifold comprises: a first end plate having a plurality of apertures formed therein; a second end plate having a plurality of apertures formed therein; and an intermediate plate disposed between the first end plate and the second end plate, the intermediate plate having a plurality of apertures formed therein, wherein a position of the intermediate plate is adjustable with respect to the first end plate and the second end plate to facilitate control of a flow through the valve.

In another embodiment, a valve for an air intake manifold comprises: a first end plate having a plurality of apertures formed therein, wherein the apertures are surrounded by frames, the frames having a first wall, a second wall, and a pair of side walls, wherein the side walls are sloped from the first wall to the second wall; a second end plate having a plurality of apertures formed therein, wherein the apertures are surrounded by frames, the frames having a first wall, a second wall, and a pair of side walls, wherein the side walls are sloped from the first wall to the second wall; and an intermediate plate disposed between the first end plate and the second end plate, the intermediate plate having a plurality of apertures formed therein, a plurality of first members formed thereon, and a plurality of second members formed thereon, the first members adapted to receive the frames formed on the first end plate, the second members adapted to receive the frames formed on the second end plate, wherein a position of the intermediate plate is adjustable with respect to the first end plate and the second end plate to facilitate control of a flow of fluid through the valve.

In another embodiment a valve for an air intake manifold comprises: a first end plate having a plurality of apertures formed therein and a first channel formed on an inner surface thereof; a second end plate having a plurality of apertures and a first channel formed on an inner surface thereof, wherein the second end plate is formed integrally with a wall of a plenum of the intake manifold; and an intermediate plate disposed between the first end plate and the second end plate, the intermediate plate having a plurality of apertures formed therein and a central shaft disposed thereon, the central shaft adapted to be received by the first channel formed in the first end plate and the first channel formed in the second end plate, wherein the position of the intermediate plate is adjustable with respect to the first end plate and the second end plate to facilitate control of a flow of fluid through the valve.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
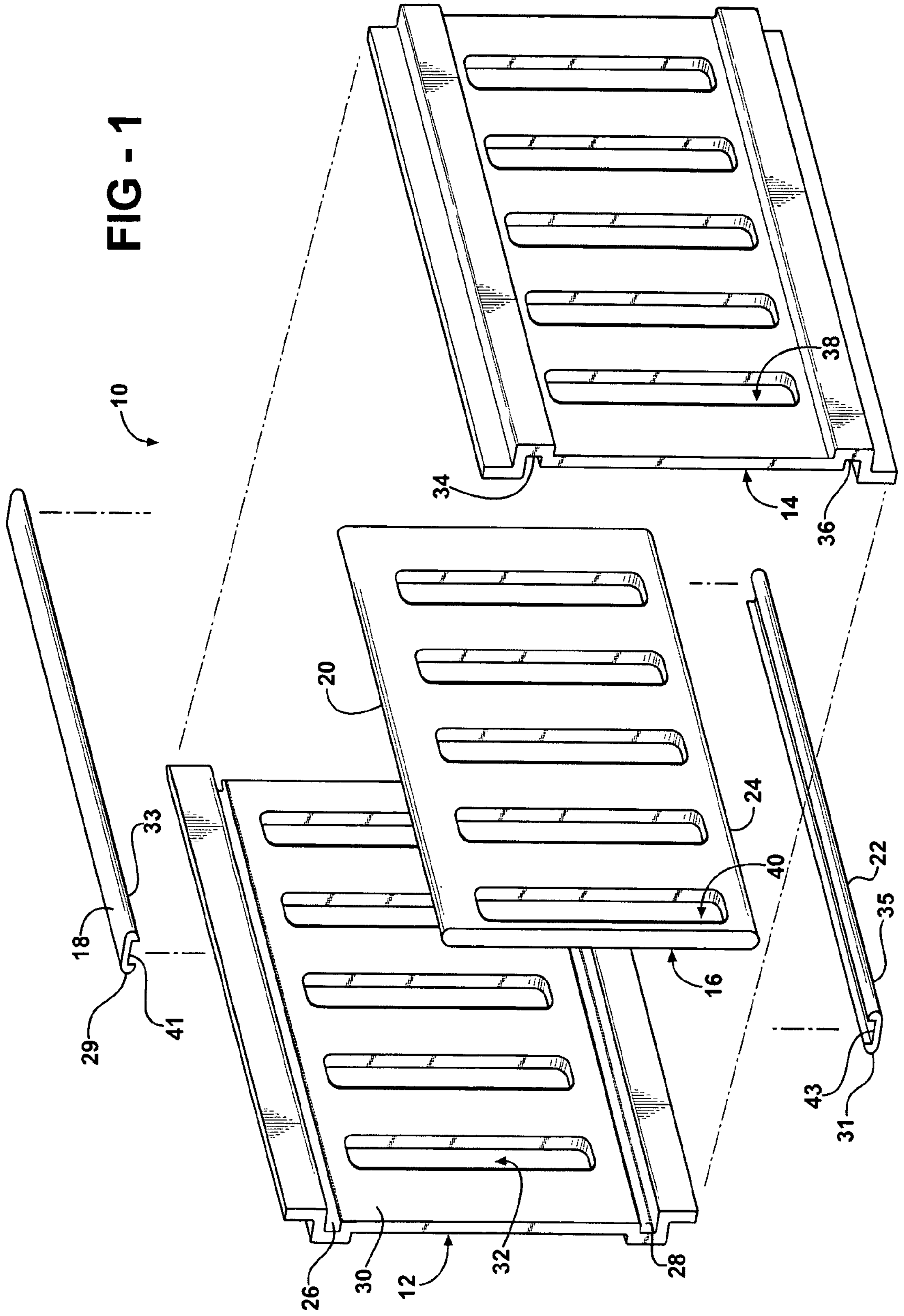
FIG. 1 is an exploded perspective view of a slide valve in accordance with an embodiment of the invention.

FIG. 1 shows a slide valve 10 in accordance with an embodiment of the invention. The valve 10 is adapted to be disposed in a wall (not shown) dividing adjacent chambers, of a plenum (not shown) of an air intake manifold (not shown). It is understood that the valve 10 can be disposed in other locations as desired. The valve 10 includes a first end plate 12, a second end plate 14, and an intermediate plate 16. The intermediate plate 16 is disposed between the first end plate 12 and the second end plate 14. It is understood that additional intermediate plates 16 can be disposed between the first end plate 12 and the second end plate 14 as desired. In the illustrated embodiment, the first end plate 12, the second end plate 14, and the intermediate plate 16 are substantially rectangular in shape. It is understood that the first end plate 12, the second end plate 14, and the intermediate plate 16 may have other shapes as desired without departing from the scope and spirit of the invention. Optionally, a sealing material (not shown) such as a elastomeric seal may be disposed on one or more of the plates 12, 14, 16.

A first bearing insert 18 is disposed between the first end plate 12 and the second end plate 14 adjacent a first end 20 of the intermediate plate 16. A second bearing insert 22 is disposed between the first end plate 12 and the second end plate 14 adjacent a second end 24 of the intermediate plate 16. In the embodiment shown, the plates 12, 14, 16 and the bearing inserts 18, 22 are formed from metal. However, other materials can be used to form the plates 12, 14, 16 and the bearing inserts 18, 22 as desired.

A first channel 26 and a second channel 28 are formed on an inner surface 30 of the first end plate 12. The first channel 26 is adapted to receive a first edge 29 of the first bearing insert 18 and the second channel 28 is adapted to receive a first edge 31 of the second bearing insert 22. A plurality of spaced apart substantially rectangular shaped apertures 32 is formed in the first end plate 12.

A first channel 34 and a second channel 36 are formed on an inner surface (not shown) of the second end plate 14. The first channel 34 is adapted to receive a second edge 33 of the first bearing insert 18 and the second channel 36 is adapted to receive a second edge 35 of the second bearing insert 22. A plurality of spaced apart substantially rectangular shaped apertures 38 is formed in the second end plate 14.

A plurality of spaced apart substantially rectangular shaped apertures 40 is formed in the intermediate plate 16. The first end 20 of the intermediate plate 16 is adapted to be received in a channel 41 formed in the first bearing insert 18. The second end 24 of the intermediate plate 16 is adapted to be received in a channel 43 formed in the second bearing insert 22.

To assemble the valve 10, the intermediate plate 16 is disposed between the first end plate 12 and the second end plate 14. The first bearing insert 18 is disposed in the first channel 26 of the first end plate 12 and in the first channel 34 of the second end plate 14. The second bearing insert 22 is disposed in the second channel 28 of the first end plate 12 and in the second channel 36 of the second end plate 14. The first end plate 12 and the second end plate 14 are then fastened by any suitable means to form the valve 10. The valve 10 is then disposed in a desired position, such as in the wall dividing adjacent chambers of the plenum of the air intake manifold, for example. It is understood that the valve 10 can be disposed in other locations as desired.

Figure 3:
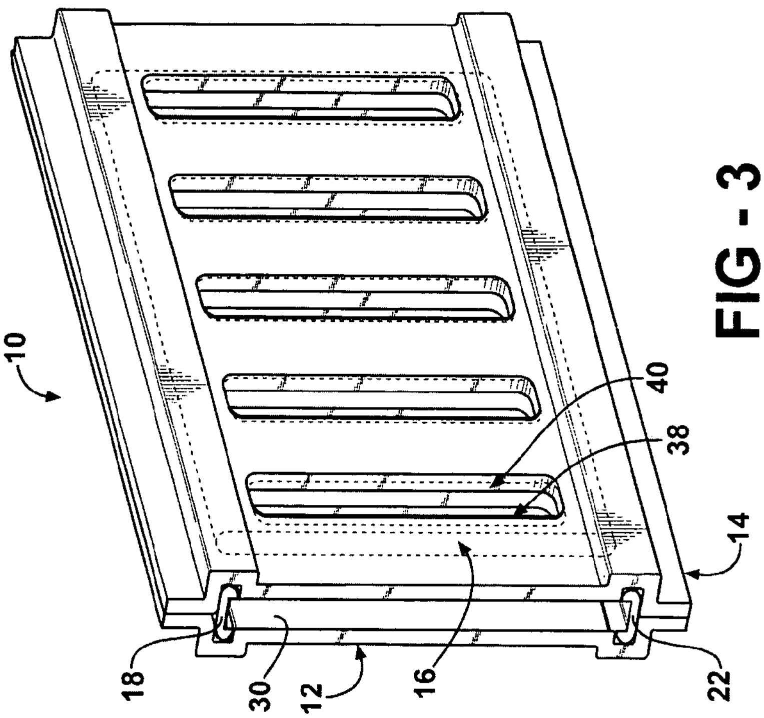
FIG. 3 is a perspective view of the slide valve illustrated in FIG. 1 in a fully open position.
Figure 2:
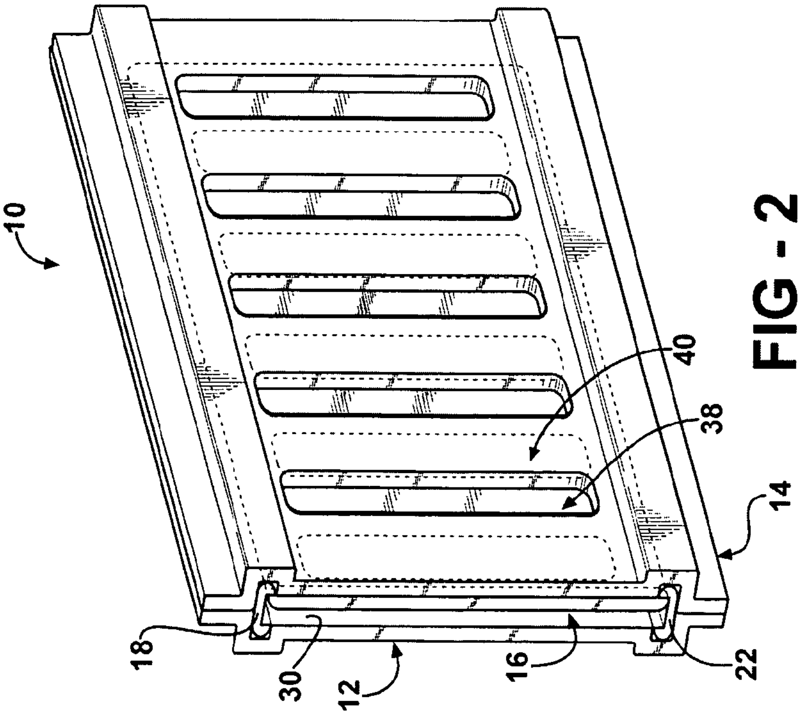
FIG. 2 is a perspective view of the slide valve illustrated in FIG. 1 in a fully closed position.

In operation, the valve 10 is movable between a closed position as shown in FIG. 2 and an open position as shown in FIG. 3. It is understood that the valve 10 can be moved to intermediate positions as desired. While the valve 10 is in an open position, the apertures 32, 40, 38 respectively formed in the plates 12, 16, 14 are aligned, and a maximum amount of a fluid such as air, for example, is permitted to flow through the valve 10. While the valve 10 is in an intermediate position, the apertures 32, 40, 38 respectively formed in the plates 12, 16, 14 are partially offset from each other, and an intermediate amount of the fluid is permitted to flow through the valve 10. While the valve 10 is in a closed position, the apertures 32, 40, 38 respectively formed in the plates 12, 16, 14 are completely offset from each other, and the flow of fluid through the valve 10 is militated against. While the valve 10 is in a closed position, since the apertures 32, 40, 38 respectively of adjacent plates 12, 16, 14 respectively are completely offset from one another, any fluid that flows between adjacent plates 12, 16, 14 respectively is caused to flow on a tortuous path through the valve 10. The tortuous path creates high impedance against any such fluid flowing through the valve 10 while in a closed position. Accordingly, the flow of such fluid through the valve 10 is militated against. If the sealing material is disposed on one or more of the plates 12, 14, 16, a quality of a seal facilitated by the closed valve 10 is maximized.

An actuating means (not shown), such as an electric actuator, for example, is operatively coupled to the intermediate plate 16. The actuating means receives a signal from a source (not shown), and causes an appropriate movement of the intermediate plate 16. If additional fluid flow through the valve 10 is desired, the intermediate plate 16 is caused to move toward the open position. If less fluid flow through the valve 10 is desired, the intermediate plate 16 is caused to move toward the closed position. The first bearing insert 18 and the second bearing insert 22 militate against the flow of the fluid around the first end 20 of the intermediate plate 16 and the second end 24 of the intermediate plate 16. As additional fluid is caused to flow through the valve 10, the fluid is caused to flow through an appropriate runner to a cylinder head.

As the valve 10 opens and closes, the plates 12, 16, 14 are caused to slide relative to one another. As the plates 12, 16, 14 slide, contact between the plates 12, 16, 14 dislodges unwanted debris, such as sludge or ice, for example, from the plates 12, 14, 16. As a result, the buildup of unwanted debris on the valve 10 is militated against, and an efficiency of the valve 10 is maximized.

Since the valve 10 operates in a plane, protrusion of the valve 10 into the flow path of the fluid is avoided. Accordingly, a flow rate of the fluid past the valve 10 is maximized. Additionally, pressure pulsations exerted on the valve 10 in the direction of operation of the valve 10 are minimized. Thus, leakage caused by an opening of the valve 10 by the pressure pulsations is minimized. Further, since the thickness of the valve 10 is smaller than other types of valves, packaging and shipping costs associated with the valve 10 are minimized.

Figure 4:
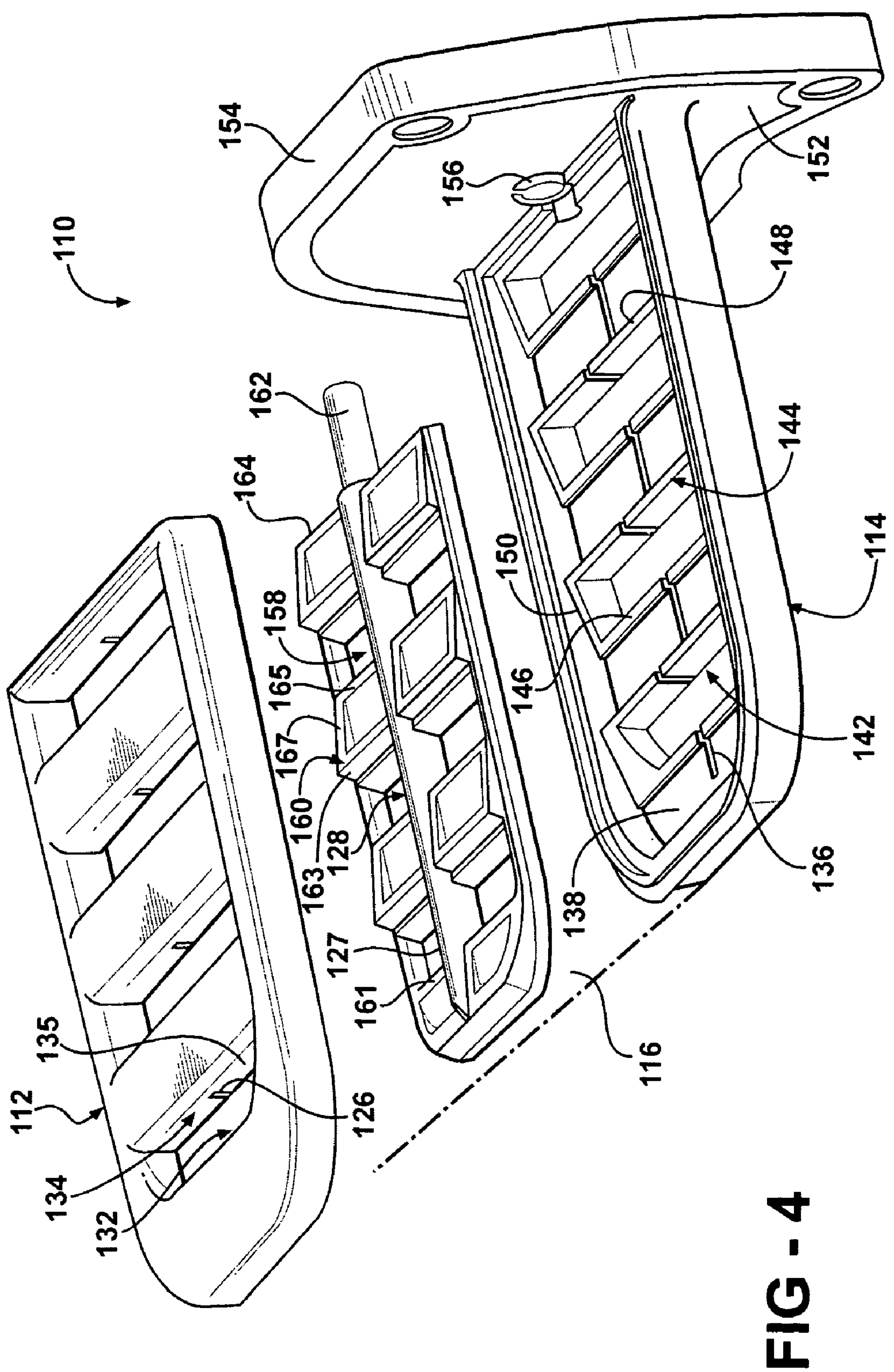
FIG. 4 is an exploded perspective view of a slide valve in accordance with another embodiment of the invention.

FIG. 4 shows a slide valve 110 in accordance with another embodiment of the invention. The valve 110 is adapted to be disposed in a wall (not shown) dividing adjacent chambers of a plenum (not shown) of an air intake manifold (not shown). It is understood that the valve 110 can be disposed in other locations as desired. The valve 110 includes a first end plate 112, a second end plate 114, and an intermediate plate 116. The intermediate plate 116 is disposed between the first end plate 112 and the second end plate 114. It is understood that additional intermediate plates 116 can be disposed between the first end plate 112 and the second end plate 114 as desired. In the embodiment shown, the plates 112, 114, 116 are formed from metal or plastic. However, other materials can be used to form the plates 112, 114, 116 as desired. In the illustrated embodiment, the first end plate 112, the second end plate 114, and the intermediate plate 166 are substantially rectangular in shape. It is understood that the plates 112, 114, 116 may have other shapes as desired without departing from the scope and spirit of the invention. Optionally, a sealing material (not shown) such as a elastomeric seal may be disposed on one or more of the plates 112, 114, 116.

A first channel 126 is formed on an inner surface (not shown) of the first end plate 112. The first channel 126 is adapted to receive a first surface 127 of a central shaft 128 disposed on the intermediate plate 116. A plurality of spaced apart substantially rectangular shaped apertures 132 is formed in the first end plate 112. A frame 134 surrounds each aperture 132 formed in the first end plate 112. The frame 134 includes a first wall (not shown), a second wall 135, and a pair of side walls (not shown). The second wall 135 extends outwardly from the first end plate 112 further than the first wall. The side walls are substantially wedge shaped and extend from the first wall to the second wall 135.

A first channel 136 is formed on an inner surface 138 of the second end plate 114. The first channel 136 is adapted to receive a second surface (not shown) of the central shaft 128 of the intermediate plate 116. A plurality of spaced apart substantially rectangular shaped apertures 142 is formed in the second end plate 114. A frame 144 surrounds each aperture 142 formed in the second end plate 114. The frame 144 includes a first wall 146, a second wall 148, and a pair of side walls 150. The second wall 148 extends outwardly from the second end plate 114 further than the first wall 146. The side walls 150 are substantially wedge shaped and extend from the first wall 146 to the second wall 148.

The second end plate 114 includes an integrally formed frame 152 that is attached to a gasket 154 disposed on an end wall (not shown) of the plenum. A bushing 156 disposed on the frame 152 is adapted to receive an extension piece 162 formed on the intermediate plate 116. It is understood that the frame 152 can be formed separately from the second end plate 114 as desired. It is also understood that the second end plate 114 can be attached to other structure as desired without departing from the scope and spirit of the invention.

A plurality of spaced apart substantially rectangular shaped apertures 158 is formed in the intermediate plate 116. The intermediate plate 116 includes a plurality of first members 160 that extend outwardly from a first surface 161 thereof. The first members 160 include a first wall 163, a second wall 165, and a pair of side walls 167. When aligned with the frames 134 of the first end plate 112, the first members 160 substantially conform to the shape of the frames 134 to form a substantially fluid tight seal therebetween. The intermediate plate 116 includes a plurality of second members (not shown) that extend outwardly from a second surface (not shown) thereof. The second surface is on an opposed side of the intermediate plate 116 from the first surface 161 thereof. The second members include a first wall, a second wall, and a pair of side walls. When aligned with the frames 144 of the second end plate 114, the second members substantially conform to the shape of the frames 144 to form a substantially fluid tight seal therebetween. The extension piece 162 extends outwardly from a first end 164 of the intermediate plate 116, and is adapted to be received in the bushing 156 of the second end plate 114.

To assemble the valve 110, the intermediate plate 116 is disposed between the first end plate 112 and the second end plate 114. The central shaft 128 disposed on the intermediate plate 116 is received by the first channel 126 of the first end plate 112. The second lip formed on the intermediate portion 116 is received by the first channel 136 of the second end plate 114. The first end plate 112 and the second end plate 114 are fastened by any suitable means to form the valve 110. The valve 110 is then disposed in a desired position, such as in the wall dividing adjacent chambers of the plenum of the air intake manifold, for example. In this situation, the frame 152 would be sealed to the gasket 154 that disposed on the end wall of the plenum in the intake manifold. It is understood that the valve 110 can be disposed in other locations as desired.

In operation, the valve 110 is movable between an open position, a closed position, and intermediate positions as desired. While the valve 110 is in an open position, the apertures 132, 158, 142 respectively formed in the plates 112, 116, 114 are aligned, and a maximum amount of a fluid such as air, for example, is permitted to flow through the valve 110. While the valve 110 is in an intermediate position, the apertures 132, 158, 142 respectively formed in the plates 112, 116, 114 are partially offset from each other, and an intermediate amount of the fluid is permitted to flow through the valve 110. While the valve 110 is in a closed position, the apertures 132, 158, 142 respectively formed in the plates 112, 116, 114 are completely offset from each other, and the flow of fluid through the valve 110 is militated against. While the valve 110 is in a closed position, since the apertures 132, 140, 138 respectively of adjacent plates 112, 116, 114 respectively are completely offset from one another, any fluid that flows between adjacent plates 112, 116, 114 respectively is caused to flow on a tortuous path through the valve 110. The tortuous path creates high impedance against any such fluid flowing through the valve 110 while in a closed position. Accordingly, the flow of such fluid through the valve 110 is militated against. If the sealing material is disposed on one or more of the plates 112, 114, 116, a quality of a seal facilitated by the closed valve 110 is maximized.

An actuating means (not shown), such as an electric actuator, for example, is operatively coupled to the extension piece 162 of the intermediate plate 116. The actuating means receives a signal from a source (not shown), and causes an appropriate movement of the intermediate plate 116 by moving the extension piece 162. If additional fluid flow through the valve 110 is desired, the intermediate plate 116 is caused to move toward the open position. If less fluid flow through the valve 110 is desired, the intermediate plate 116 is caused to move toward the closed position. As additional fluid is caused to flow through the valve 110, the fluid is caused to flow through an appropriate runner to a cylinder head.

As the valve 110 opens and closes, the plates 112, 116, 114 are caused to slide relative to one another. As the plates 112, 116, 114 slide, contact between the plates 112, 116, 114 dislodges unwanted particles and debris from the plates 112, 114, 116. As a result, the buildup of debris, such as sludge or ice, for example, on the valve 110 is militated against, and an efficiency of the valve 110 is maximized. However, since the side walls of the frames 134 of the first end wall 112 are substantially wedge shaped and the side walls 167 of the first members 160 are substantially wedge shaped, surface to surface contact between the frames 134 and the first end plate 112 is minimized when the position of the intermediate plate 116 is being adjusted. Similarly, since the side walls 150 of the frames 144 of the second end wall 114 are substantially wedge shaped and the side walls of the second members are substantially wedge shaped, surface to surface contact between the second members and the frames 144 is minimized when the position of the intermediate plate 116 is being adjusted. Accordingly, deterioration of the plates 112, 116, 114 while the position of the intermediate plate 116 is being adjusted is minimized, and the efficiency of the valve 110 is maximized. Though surface to surface contact between the plates 112, 114, 116 is minimized while the position of the valve 110 is being adjusted is minimized, a substantially fluid tight seal is facilitated between the first end plate 112 and the intermediate plate 116 and the second end plate 114 and the intermediate plate 116 while the valve 110 is in a closed position.

Since the valve 110 operates in a plane, protrusion of the valve 10 into the flow path of the fluid is avoided. Accordingly, a flow rate of the fluid past the valve 110 is maximized. Additionally, pressure pulsations exerted on the valve 10 in the direction of operation of the valve 10 are minimized. Thus, leakage caused by an opening of the valve 110 by the pressure pulsations is minimized. Further, since the thickness of the valve 110 is smaller than other types of valves, packaging and shipping costs associated with the valve 110 are minimized.

Figure 5:
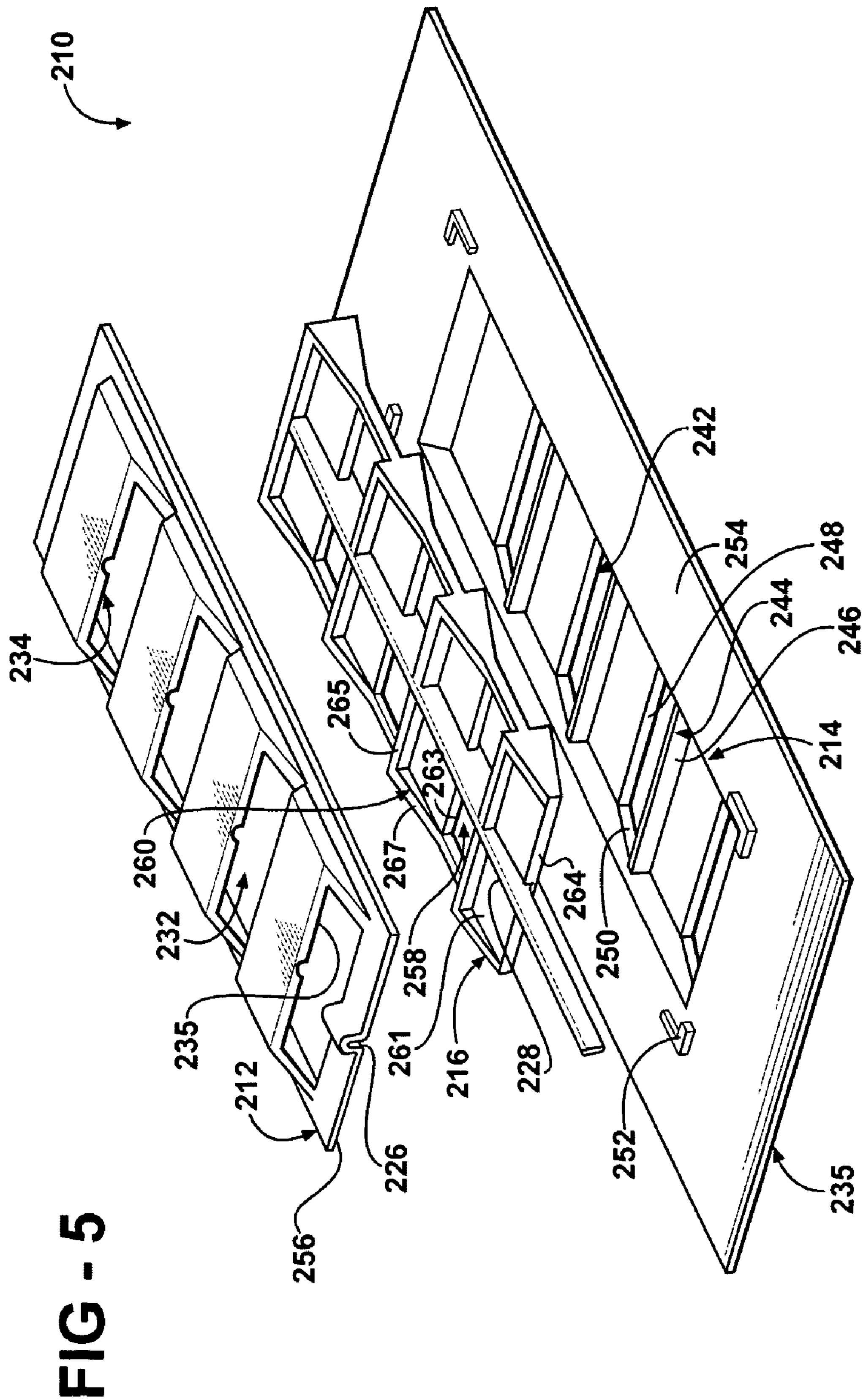
FIG. 5 is an exploded perspective view of a slide valve in accordance with another embodiment of the invention.

FIG. 5 shows a slide valve 210 in accordance with another embodiment of the invention. The valve 210 is adapted to be disposed between adjacent chambers of a plenum (not shown) of an air intake manifold (not shown). The valve 210 includes a first end plate 212, a second end plate 214, and an intermediate plate 216. The intermediate plate 216 is disposed between the first end plate 212 and the second end plate 214. It is understood that additional intermediate plates 216 can be disposed between the first end plate 212 and the second end plate 214 as desired. In the embodiment shown, the plates 212, 214, 216 are formed from metal or plastic. However, other materials can be used to form the plates 212, 214, 216 as desired. In the embodiment illustrated, the first end plate 212, the second end plate 214, and the intermediate plate 166 are substantially rectangular in shape. It is understood that the plates 212, 214, 216 may have other shapes as desired without departing from the scope and spirit of the invention. Optionally, a sealing material (not shown) such as a elastomeric seal may be disposed on one or more of the plates 212, 214, 216.

A first channel 226 is formed on an inner surface (not shown) of the first end plate 212. The first channel 226 is adapted to receive a central shaft 228 disposed on the intermediate plate 216. A plurality of spaced apart substantially rectangular shaped apertures 232 is formed in the first end plate 212. A frame 234 surrounds each aperture 232 formed in the first end plate 212. The frame 234 includes a first wall (not shown), a second wall 235, and a pair of side walls (not shown). The first wall extends outwardly from the first end plate 212 further than the second wall 235. The side walls are substantially wedge shaped and extend from the first wall to the second wall 235.

In the embodiment illustrated, the second end plate 214 is formed integrally with a wall 235 of the plenum of the air intake manifold, wherein the wall 235 divides the plenum into adjacent chambers. A plurality of spaced apart substantially rectangular shaped apertures 242 is formed in the second end plate 214. A frame 244 surrounds each aperture 242 formed in the second end plate 214. The frame 244 includes a first wall 246, a second wall 248, and a pair of side walls 250. The first wall 246 extends outwardly from the second end plate 214 further than the second wall 248. The side walls 250 are substantially wedge shaped and extend from the first wall 246 to the second wall 248.

In the embodiment illustrated, the second end plate 214 includes a plurality of protuberances 252 that extend outwardly from a first surface 254 of the second end plate 214. The protuberances 252 are adapted to receive an outer edge 256 of the first end plate 212. It is understood that additional or fewer protuberances 252 can extend from the first surface 254 of the second end plate 214 as desired.

A plurality of spaced apart substantially rectangular shaped apertures 258 is formed in the intermediate plate 216. The intermediate plate 216 includes a plurality of first members 260 that extend outwardly from a first surface 261 thereof. The first members 260 include a first wall 263, a second wall 265, and a pair of side walls 267. When aligned with the frames 234 of the first end plate 212, the first members 260 substantially conform to the shape of the frames 234 to form a substantially fluid tight seal therebetween. The intermediate plate 216 includes a plurality of second members (not shown) that extend outwardly from a second surface (not shown) thereof. The second surface is on an opposed side of the intermediate plate 216 from the first surface 261 thereof. The second members include a first wall, a second wall, and a pair of side walls. When aligned with the frame 244 of the second end plate 214, the second members substantially conform to the shape of the frames 244 to form a substantially fluid tight seal therebetween. An extension piece 262 extends outwardly from a first end 264 of the intermediate plate 216.

To assemble the valve 210, the intermediate plate 216 is disposed between the first end plate 212 and the second end plate 214. The first lip 228 formed on the intermediate plate 216 is received by the first channel 226 of the first end plate 212. The first end plate 212 and the second end plate 214 are then fastened by any suitable means to form the valve 210. The valve 210 is then disposed into the plenum between adjacent chambers thereof. It is understood that the valve 210 may be disposed in other locations as desired.

In operation, the valve 210 is movable between an open position, a closed position, and an infinite number of intermediate positions as desired. While the valve 210 is in an open position, the apertures 232, 258, 242 respectively formed in the plates 212, 216, 214 are aligned, and a maximum amount of a fluid such as air, for example, is permitted to flow through the valve 210. While the valve 210 is in an intermediate position, the apertures 232, 258, 242 respectively formed in the plates 212, 216, 214 are partially offset from each other, and an intermediate amount of the fluid is permitted to flow through the valve 210. While the valve 210 is in a closed position, the apertures 232, 258, 242 respectively formed in the plates 212, 216, 214 are completely offset from each other, and the flow of fluid through the valve 210 is militated against. While the valve 210 is in a closed position, since the apertures 232, 240, 238 respectively of adjacent plates 212, 216, 214 respectively are completely offset from one another, any fluid that flows between adjacent plates 212, 216, 214 respectively is caused to flow on a tortuous path through the valve 210. The tortuous path creates high impedance against any such fluid flowing through the valve 210 while in a closed position. Accordingly, the flow of such fluid through the valve 210 is militated against. If the sealing material is disposed on one or more of the plates 212, 214, 216, a quality of a seal facilitated by the closed valve 210 is maximized.

An actuating means (not shown), such as an electric actuator, for example, is operatively coupled to the extension piece 262 of the intermediate plate 216. The actuating means receives a signal from a source (not shown), and causes an appropriate movement of the intermediate plate 216 by moving the extension piece 262. If additional fluid flow through the valve 210 is desired, the intermediate plate 216 is caused to move toward the open position. If less fluid flow through the valve 210 is desired, the intermediate plate 216 is caused to move toward the closed position. As additional fluid is caused to flow through the valve 210, the fluid is caused to flow through an appropriate runner toga cylinder head.

As the valve 210 opens and closes, the plates 212, 216, 214 are caused to slide relative to one another. As the plates 212, 216, 214 slide, contact between the plates 212, 216, 214 dislodges unwanted particles and debris from the plates 212, 216, 214. As a result, the buildup of debris on the valve 210 is militated against, and an efficiency of the valve 210 is maximized. However, since the side walls of the frames 234 of the first end wall 212 are substantially wedge shaped and the side walls 267 of the first members 260 are substantially wedge shaped, surface to surface contact between the first members 260 and the frames 234 is minimized when the position of the intermediate plate 216 is being adjusted. Similarly, since the side walls 250 of the frames 244 of the second end wall 214 are substantially wedge shaped and the side walls of the second members are substantially wedge shaped, surface to surface contact between the second members and the frames 244 is minimized when the position of the intermediate plate 216 is being adjusted. Accordingly, deterioration of the plates 212, 216, 214 is minimized, and an efficiency of the valve 210 is maximized. Though surface to surface contact between the plates 212, 214, 216 is minimized while the position of the valve 210 is being adjusted is minimized, a substantially fluid tight seal is facilitated between the first end plate 212 and the intermediate plate 216 and the second end plate 214 and the intermediate plate 216 while the valve 210 is in a closed position.

Since the valve 210 operates in a plane, protrusion of the valve 210 into the flow path of the fluid is avoided. Accordingly, a flow rate of the fluid past the valve 210 is maximized. Additionally, pressure pulsations exerted on the valve 210 in the direction of operation of the valve 210 are minimized. Thus, leakage caused by an opening of the valve 210 by pressure pulsations is minimized. Further, since the thickness of the valve 210 is smaller than other types of valves, packaging and shipping costs associated with the valve 210 are minimized. Moreover, since the second end plate 214 is formed integrally with the wall 235, the need for additional sealing structure for sealing the second end plate 214 to the wall 235 and the steps associated therewith are minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A valve for an air intake manifold comprising:

a first end plate having a plurality of apertures formed therein, wherein the apertures are surrounded by frames, the frames having a first wall, a second wall, and a pair of side walls, wherein the side walls are sloped from the first wall to the second wall;

a second end plate having a plurality of apertures formed therein, wherein the apertures are surrounded by frames, the frames having a first wall, a second wall, and a pair of side walls, wherein the side walls are sloped from the first wall to the second wall; and an intermediate plate disposed between the first end plate and the second end plate, the intermediate plate having a plurality of apertures formed therein, wherein a position of the intermediate plate is adjustable with respect to the first end plate and the second end plate to facilitate control of a flow through the valve.

2. The valve according to claim 1, wherein the second end plate is formed integrally with a wall of a plenum of the air intake manifold.

3. The valve according to claim 1, wherein the intermediate plate is selectively movable between an open position, a closed position, and intermediate positions.

4. The valve according to claim 3, wherein a tortuous path is formed between at least one of the first plate and the intermediate plate and the intermediate plate and the second plate, while the valve is in a closed position.

5. The valve according to claim 1, wherein at least one of the first end plate, the second end plate, and the intermediate plate include a sealing material disposed thereon.

6. The valve according to claim 1, wherein the first end plate includes a first channel formed on an inner surface thereof and the second end plate includes a first channel formed on an inner surface thereof.

7. The valve according to claim 6, wherein the first channel formed in the first plate is adapted to receive a central shaft disposed on the intermediate plate, and the first channel formed in the second plate is adapted to receive the central shaft disposed on the intermediate plate.

8. The valve according to claim 6, wherein the first end plate includes a second channel formed on the inner surface thereof and the second end plate includes a second channel formed on the inner surface thereof, wherein the first channel formed in the first end plate and the first channel formed in the second end plate cooperate to house a first bearing insert and the second channel formed in the first end plate and the second channel formed in the second end plate cooperate to house a second bearing insert.

9. The valve according to claim 1, wherein the intermediate plate is adapted to be operatively coupled to an actuating means for selectively moving the valve between an open position and a closed position.

10. The valve according to claim 1, wherein adjustment to the position of the intermediate plate facilitates a dislodging of unwanted materials disposed on at least one of the first plate, the second plate, and the intermediate plate.

11. The valve according to claim 1, wherein an operation of the valve is in a plane.

12. A valve for a plenum of an air intake manifold comprising:

a first end plate having a plurality of apertures formed therein, wherein the apertures are surrounded by frames, the frames having a first wall, a second wall, and a pair of side walls, wherein the side walls are sloped from the first wall to the second wall;

a second end plate having a plurality of apertures formed therein, wherein the apertures are surrounded by frames, the frames having a first wall, a second wall, and a pair of side walls, wherein the side walls are sloped from the first wall to the second wall; and an intermediate plate disposed between the first end plate and the second end plate, the intermediate plate having a plurality of apertures formed therein, a plurality of first members formed thereon, and a plurality of second members formed thereon, the first members adapted to receive the frames formed on the first end plate, the second members adapted to receive the frames formed on the second end plate, wherein a position of the intermediate plate is adjustable with respect to the first end plate and the second end plate to facilitate control of a flow of fluid through the valve.

13. The valve according to claim 12, wherein the second end plate is formed integrally with a wall of a plenum of the air intake manifold.

14. The valve according to claim 12, wherein the intermediate plate is selectively movable between an open position, a closed position, and intermediate positions.

15. The valve according to claim 12, wherein the first end plate includes a first channel formed on an inner surface thereof and the second end plate includes a first channel formed on an inner surface thereof, wherein the first channel formed in the first plate is adapted to receive a central shaft disposed on the intermediate plate, and the first channel formed in the second plate is adapted to receive the central channel disposed on the intermediate plate.

16. The valve according to claim 12, wherein the intermediate plate is adapted to be operatively coupled to an actuating means for selectively moving the valve between an open position and a closed position.

17. A valve for an air intake manifold comprising:

a first end plate having a plurality of apertures formed therein and a first channel formed on an inner surface thereof, wherein the apertures are surrounded by frames, the frames having a first wall, a second wall, and a pair of side walls, wherein the side walls are sloped from the first wall to the second wall;

a second end plate having a plurality of apertures and a first channel formed on an inner surface thereof, wherein the apertures are surrounded by frames, the frames having a first wall, a second wall, and a pair of side walls, wherein the side walls are sloped from the first wall to the second wall, wherein the second end plate is formed integrally with a wall of a plenum of the intake manifold; and an intermediate plate disposed between the first end plate and the second end plate, the intermediate plate having a plurality of apertures formed therein and a central shaft disposed thereon, the central shaft adapted to be received by the first channel formed in the first end plate and the first channel formed in the second end plate, wherein the position of the intermediate plate is adjustable with respect to the first end plate and the second end plate to facilitate control of a flow of fluid through the valve.

* * * * *